United States Patent

Bertness et al.

[11] Patent Number: 6,044,108
[45] Date of Patent: Mar. 28, 2000

[54] SYSTEM AND METHOD FOR SUPPRESSING FAR END ECHO OF VOICE ENCODED SPEECH

[75] Inventors: Edwin A. Bertness; David C. Oliver, both of San Antonio, Tex.

[73] Assignee: Data Race, Inc., San Antonio, Tex.

[21] Appl. No.: 08/864,416

[22] Filed: May 28, 1997

[51] Int. Cl.[7] .............................. H04B 1/38; H04B 1/66
[52] U.S. Cl. ..................... 375/222; 375/240; 704/500
[58] Field of Search ........................... 375/222, 240–242, 375/254, 285; 370/286, 289, 433, 435, 468, 477; 379/406, 410; 704/500, 503; 381/100, 103

[56] References Cited

U.S. PATENT DOCUMENTS

| | | | |
|---|---|---|---|
| 5,524,134 | 6/1996 | Gustafson et al. | 445/410 |
| 5,754,589 | 5/1998 | Maitra et al. | 375/216 |
| 5,754,590 | 5/1998 | Mays et al. | 375/222 |
| 5,822,328 | 10/1998 | Derby et al. | 370/507 |
| 5,864,560 | 1/1999 | Li et al. | 370/465 |
| 5,864,795 | 1/1999 | Bartkowiak | 704/216 |

*Primary Examiner*—Young T. Tse
*Attorney, Agent, or Firm*—Conley, Rose & Tayon, P.C.; Robert C. Kowert; Jeffrey C. Hood

[57] ABSTRACT

A system and method for performing far end echo suppression of compressed speech frames in a telecommunications system. The system comprises a client modem and a server modem coupled together via a communications path. A controller in the server modem receives a first series of compressed speech frames from the client modem and provides the frames to a vocoder. Each of the frames includes voice encoded speech parameters. The controller maintains a history of a volume parameter value of the most recently provided frames to the vocoder. The vocoder decompresses the first frames to produce a first speech signal for transmission onto a telephone line. An echo of the speech signal may occur due to impedance mismatches between a hybrid in the server modem and the telephone line. The echo is received by the vocoder along with a second subscriber's speech signal from the telephone line. The echo and second speech signal are compressed by the vocoder into a second series of compressed speech frames which are provided to the controller. In particular, one of the parameters is a volume parameter whose value indicates the energy in the speech which was compressed. The controller compares the volume parameter value of each of the frames it receives from the vocoder to the volume parameter value of a frame in the history, i.e., a frame previously provided to the vocoder, to determine if the echo is present. If the echo is present, the controller substitutes a quiet frame for the echo-laden frame in order to suppress, or squelch, the echo prior to transmitting the second series of frames to the client. In one embodiment, comparing the volume parameters comprises calculating a ratio of the volume parameter of the frame received from the vocoder with the volume parameter value in the history and determining if the ratio is less than a predetermined value.

20 Claims, 3 Drawing Sheets

SYSTEM AND METHOD FOR SUPPRESSING FAR END ECHO OF VOICE ENCODED SPEECH

FIELD OF THE INVENTION

The present invention relates to the suppression of echoed speech on a telecommunication line, and in particular to echo suppression of voice encoded speech.

DESCRIPTION OF THE RELATED ART

A typical communications path between two subscribers in a telephone network comprises a near end subscriber unit and a far end subscriber unit coupled together by a transmission line. Typically the transmission line is actually comprised of two or more separate transmission lines each coupled together by switches in the network. Each switch is located in what is commonly referred to as a central office (CO). The subscriber units typically comprise a telephone handset, modem, telephone answering machine, or other communications device or combination thereof.

A common phenomenon known as "echo" is often experienced by subscribers when communicating on a communications path such as the typical communications path just described. Echo may be defined as the return, or reflection, of a talker's voice on the communications path. The major cause of echo on a communications path may be attributed to impedance mismatches on the communications path. Echo may be an annoying problem for subscribers attempting to communicate on the communications path. The annoyance of echo to a subscriber is primarily a function of the loudness of the echo and the delay time of the echo.

The delay time of an echo may be expressed in terms of the "round-trip" time, typically measured in milliseconds, for the echo to return to the talker. Once the delay time of an echo reaches approximately 50 milliseconds, the echo becomes so annoying that the CCITT standard recommends the use of an echo suppressor to suppress the echo. The delay time of an echo is primarily a function of the velocity of propagation of the transmission lines and any other pertinent components of the communications path as well as the length of the transmission lines.

One method for dealing with echo is echo cancellation. Echo cancellers work by subtracting a fraction of the transmitted near end speech from the received far end speech. Commonly employed echo cancellers typically work well to reduce the echo enough to cancel most of the echo. Any remaining echo after echo cancelling has occurred is referred to as "residual echo." Typically the residual echo is small enough such that if the subscriber at the far end is talking, the residual echo is covered up by the far end speech. However, if the far end subscriber is silent, the residual echo may still be annoying.

Digital storage and communication of voice or speech signals has become increasingly prevalent in modern society, in particular in telephony. Digital communication of speech signals comprises generating a digital representation of the speech signals and then transmitting those digital representations to a receiver upon a communications path. The receiver receives the digital representation of the speech and converts the digital representation of the speech signals back into the original speech, or at least an approximation of the original speech.

One prevalent form of digital speech representation is a parametric representation of the speech signals. A parametric representation of speech signals involves representing the speech signal as a plurality of parameters which affect the output of a model for speech production. A parametric representation of speech signals is accomplished by first generating a digital waveform representation using speech signal sampling and quantization and then further processing the digital waveform to obtain parameters of the model for speech production. Examples of parameters include a pitch parameter and an amplitude parameter. The amplitude parameter is also referred to as the volume parameter. Parametric representations of speech signals are commonly referred to as voice encoded speech or digitally encoded speech.

Once the voice encoded speech has been generated it may be transmitted to a receiver. The receiver receives the voice encoded speech and decodes it to produce an approximation of the original speech. Devices which perform voice encoding and decoding are commonly referred to as voice encoder/decoders, or vocoders. Because the amount of digital information which represents the voice encoded speech is typically much less than that required for the original speech, the voice encoded speech is also commonly referred to as compressed speech.

One recent application of using compressed speech in digital communications is in Digital Simultaneous Voice and Data (DSVD) modems. DSVD modems employ techniques for multiplexing compressed speech with digital data for transmission over a normal telephone line. A first DSVD modem compresses, or encodes, a transmitting subscriber's speech, time multiplexes it with data from the transmitting subscriber's digital device such as a computer, and transmits the multiplexed speech and data stream upon a telephone line to a second DSVD modem. The second DSVD modem receives the multiplexed speech and data stream, separates the speech and data, and decompresses, or decodes, the compressed speech back into the original analog speech signal so that it can be provided to the receiving subscriber. The same process occurs in the opposite direction, thus enabling the two subscribers at each end of the telephone line to speak to one another, while simultaneously transferring data over the same line. A common use of DSVD modems is in the area of collaborative work, such as a whiteboard application which allows two users to annotate a shared document, for example, while simultaneously speaking to one another about the annotations on the same telephone line.

In some circumstances an echo is generated by the receiving or "far end" subscriber back to the transmitting or "near end" subscriber. The decompressed analog speech signal at the far end which was transmitted by the near end subscriber, is reflected by impedance mismatches in the transmission path, such as a 2-wire to 4-wire hybrid circuit, as an echo signal. This "far end echo" signal, along with any speech which the far end subscriber may be generating, is compressed by the far end modem, transmitted to the near end modem, and decompressed by the near end modem for presentation to the near end subscriber. If the far end subscriber is silent and therefore not "covering up" the far end echo, the echo may in many cases be annoying to the near end subscriber. This is because the echo delay may be relatively large because the compressing and decompressing of the speech typically introduces substantial delays, often resulting in round-trip delays approaching 120 milliseconds. Therefore, a method for suppressing far end echo of voice encoded speech is desired.

SUMMARY OF THE INVENTION

The present invention provides a system and method for performing far end echo suppression of compressed speech frames in a telecommunications system. The system comprises a client modem and a server modem coupled together via a communications path. The client modem is operated by a first subscriber. The server modem is coupled through a telephone line and network, such as a PBX or the PSTN, to the second subscriber.

The server modem receives a first series of compressed speech frames from the client modem (generated by the first subscriber) and decompresses the frames to produce a speech signal. The server modem then provides the speech signal onto a telephone line to a second subscriber. An echo of the speech signal may occur due to impedance mismatches between the server modem and the telephone line and a network coupled to the telephone line. The echo is received by the server modem along with the second subscriber's speech signal on the telephone line. The echo and second speech signal are compressed by the server modem into a second series of compressed speech frames. The second series of frames are transmitted by the server modem on the communications path to the client modem. Each of the frames in the first and second series of frames includes voice encoded speech parameters. In particular, one of the parameters is a volume parameter whose value indicates the energy in the speech which was compressed. Advantageously, the server modem compares the volume parameter value of each of the second series of frames to a previously received one of the first series of frames to determine if the echo is present. If the echo is present, the server modem transmits a quiet frame to the client instead of the current one of the second series of frames. This operates to suppress, or squelch, the echo.

In one embodiment, the communications path comprises two telephone lines coupled together by the public switched telephone network (PSTN). In another embodiment, a portion of the communications path comprises a wireless communications path. Preferably, the client modem is also coupled to a telephone which generates voice signals in response to the client subscriber's speech. The client modem compresses the client's speech into the first series of compressed speech frames transmitted to the server modem. Preferably, the client modem is comprised within a computer or other data communications device. Preferably, the client modem is capable of performing DSVD communications with the server modem. The client modem multiplexes the first series of compressed speech frames with data frames from the computer and transmits the multiplexed series of frames to the server modem. Likewise, the client modem receives a multiplexed series of frames comprising the second series of compressed speech frames and data frames from the server modem. In one embodiment, the server is comprised within an Internet Service Provider remote data site and the data frames comprise data from the Internet.

Preferably, the server modem is capable of performing DSVD communications with the client modem. The server modem is comprised within a communications server. Preferably, the communications server comprises a computer, such as a personal computer. The server modem comprises a data pump coupled to the communications path. The data pump receives the multiplexed data and speech frames from the communications path and provides the frames to a controller coupled to the data pump. The controller demultiplexes the data frames from the speech frames and provides the speech frames to a vocoder coupled to the controller and provides the data frames to the server. The vocoder decompresses the speech frames to produce voice signals. The voice signals are provided on the telephone line to the network, which provides the voice signals to the second subscriber.

As mentioned, the voice signal received from the telephone line by the vocoder may include an echo signal which results from an impedance mismatch between the server modem and the telephone line and network. Preferably, the network comprises a PBX within an office or the PSTN such as for connecting to the Internet. Thus, the vocoder receives the second subscriber's voice signal, which may include the echo signal, from the telephone line and compresses the voice signal and echo signal into the second series of compressed speech frames. The vocoder provides the second series of compressed speech frames to the controller. The controller receives the second series of frames from the vocoder and calculates the ratio of the volume parameter value of each of the second series of compressed speech frames to the volume parameter value of one of the previously received first series of compressed speech frames to determine if the echo is present in each second series frame. If the ratio is less than a predetermined value, the controller determines that the echo may be present in the frame since the energy from the second subscriber's speech is substantially less than the energy from the client's speech. If the controller determines that the echo may be present, the controller provides a quiet frame to the data pump for transmission to the client to suppress the echo, instead of providing the frame in which the echo is present. If the echo is not present, the controller provides the compressed speech frame to the data pump.

In one embodiment, the controller also determines if each second series frame volume parameter value is greater than a second predetermined value and only provides the quiet frame if the volume parameter value is not greater than the second predetermined value. That is, if the second subscriber's speech energy is substantially large to "cover up" the echo of the client's speech, then the controller does not suppress the echo. In one embodiment, the controller provides an additional quiet frame after the first quiet frame of echo is detected. That is, the controller substitutes a quiet frame not only for the frame in which the echo was detected, but also for the next frame in the second series of compressed speech frames.

Preferably, a "quiet frame" comprises a frame of compressed audio which was sampled with the microphone portion of a telephone subscriber handset removed from the circuit, thereby producing a frame in which sound is essentially absent. That is, only white noise is sampled and stored in the quiet frame. In an alternate embodiment, a quiet frame comprises a frame in which silence has been compressed. In an alternate embodiment, a quiet frame comprises a frame in which the volume parameter of the compressed speech has been assigned a zero value.

Preferably, the client and server modems are capable of performing DSVD communications. That is, the controller also receives data frames from the computer in addition to the second series of compressed speech frames and quiet frames. The controller multiplexes the data and speech and quiet frames into a series of frames which is provided to the data pump. The data pump transmits the series of frames to the client modem. The client modem demultiplexes the data and speech frames and decompresses the speech frames to produce a voice signal which the first subscriber or client hears. Furthermore, the server modem receives multiplexed data and speech frames from the client modem. The server modem controller demultiplexes the frames, provides the speech frames to the vocoder and provides the data frames to the server.

Thus, the present invention provides a system and method for suppressing an echo signal which may occur at a far end subscriber, wherein the echo signal is compressed into voice encoded compressed speech frames. The echo delay time may be substantial due to the speech compression being performed by the two modems at each end of the communications path. This substantial echo delay time may cause the echo to be particularly annoying to the client and must be suppressed. The echo suppression is advantageously performed by the server modem substituting quiet frames for echo-laden speech frames prior to transmission to the near end modem. The determination of the presence of echo is made by the server modem by examining the ratio of the energy of the far end and near end speech.

BRIEF DESCRIPTION OF THE DRAWINGS

A better understanding of the present invention can be obtained when the following detailed description of the preferred embodiment is considered in conjunction with the following drawings, in which.

Figure 1:
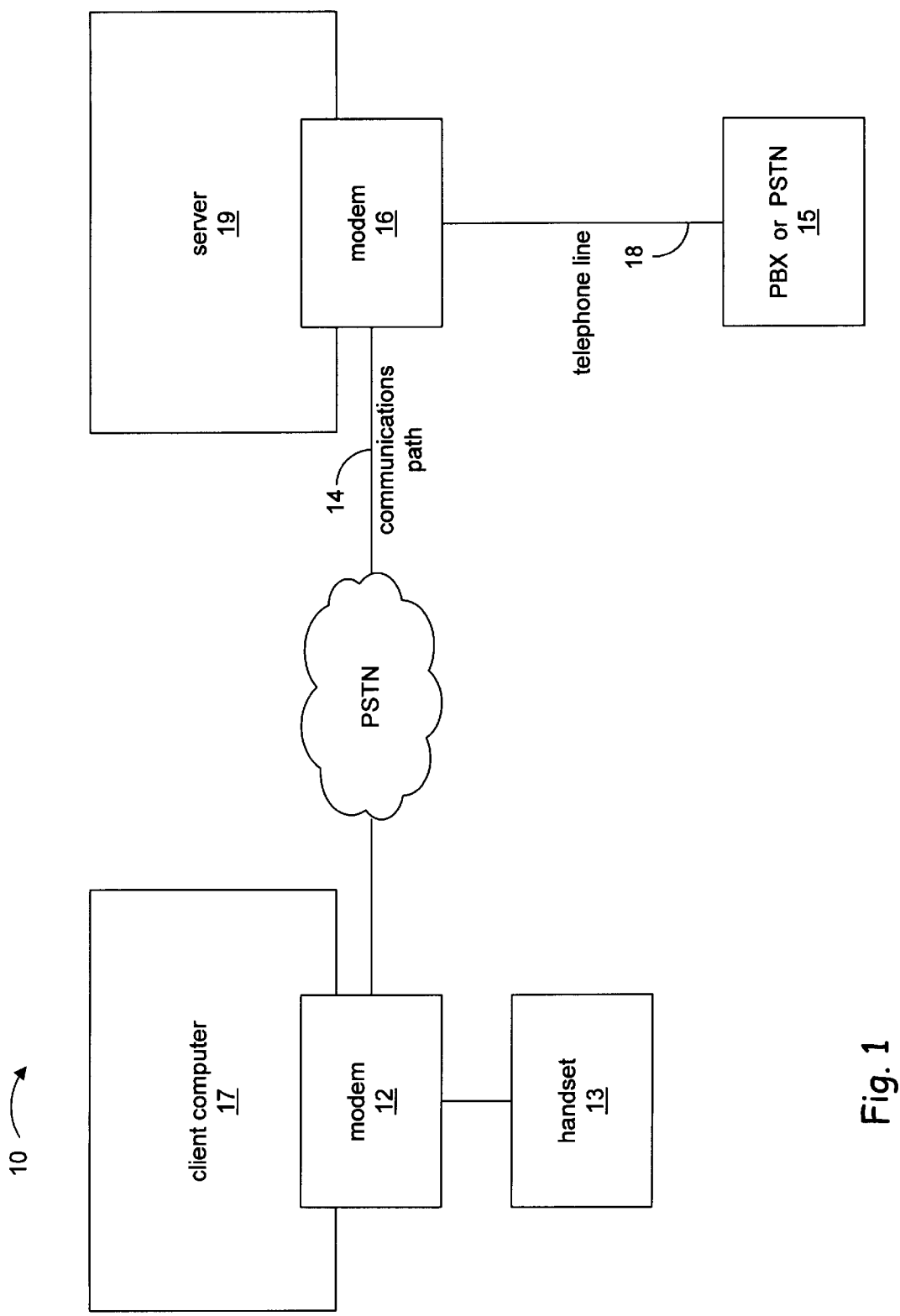
FIG. 1 is a block diagram of a telecommunications system according to a preferred embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

FIG. 1—Telecommunications System Block Diagram

Referring now to FIG. 1, a block diagram of a telecommunications system 10 comprising modems according to the preferred embodiment of the present invention is shown. The term "modem" used herein is intended to refer to any of various types of communication devices, including analog modems, DSVD modems, ISDN terminal adapters, and ADSL devices, among others.

The system 10 comprises a client modem 12, comprised within a client computer 17, in communication with a server modem 16, comprised within a communications server 19, via a communications path 14. Preferably, the communications path 14 comprises a first telephone line coupled to the client modem 12 and a second telephone line coupled to the server modem 16, wherein the two telephone lines are coupled together via and/or comprise part of the public switched telephone network (PSTN). In another embodiment, portions of the communications path comprise wireless communications means. For example, the client modem 12 may be comprised within a notebook computer and the modem 12 performs wireless communications with the PSTN via a wireless communications system.

Preferably, the client modem 12 is further coupled to a subscriber unit, such as a handset 13, which is used by the client subscriber to speak with a second subscriber. Preferably, the server modem 16 is coupled to a network 15, such as a PBX or the PSTN by a telephone line 18, or more generally a communication path. A subscriber unit (not shown) used by a second subscriber is coupled to the network 15 and communicates with the client subscriber through the system 10 via the network 15, telephone line 18, server modem 16, communications path 14, client modem 12 and handset 13.

Preferably, the client computer 17 may be any type of data access device, including a general purpose computer, a personal digital assistant (PDA), a network computer, or television or other viewing device configured as an Internet access device or information access device. The computer 17 is capable of controlling the client modem 12 to perform data transfers with the server 19. The modem 12 may be an internal modem or an external modem, i.e., may be comprised within or external to the client computer 17. Likewise, the server modem 16 may be comprised within or external to the server 19.

Preferably the server 19 comprises a computer, such as a personal computer, including a processor, memory, mass storage devices, input/output devices, display devices, network interface cards and a power supply such as are well known in the art of computer systems. Preferably, the server 19 is comprised within a remote data site, such as an Internet Service Provider (ISP) site, or a remote office including a PBX. For more information of an ISP embodiment, please see related co-pending application Ser. No. 08/708,267 titled "System and Method for Providing User Connectivity to a Remote Data Site on a Communication Line While Maintaining Telephone Connectivity on the Communication Line" filed Sep. 6, 1996, which is hereby incorporated by reference. For more information on a remote office embodiment, please see related co-pending application Ser. No. 08/559,472 titled "System and Method for Providing a Remote User With a Virtual Presence to an Office" filed Nov. 15, 1995, which issued Jun. 9, 1998 as U.S. Pat. No. 5,764,639, and which is hereby incorporated by reference.

The server 19 functions as a data source for transferring data to or from the client computer 17. For example, if the server 19 is comprised within an ISP, the server 19 is coupled to the Internet and transfers data between the client computer 17 and the Internet. The server 19 enables the client computer 17 to "surf the net." In another example, the server 19 is comprised within a remote office, and the server 19 is coupled to a PBX which enables the client to enjoy a "virtual presence" within the remote office even though the client resides at a remote location, such as on the road or at home. In this embodiment, the remote client is enabled to access PBX functions and access a local area network (LAN) within the office as if present in the office.

Preferably, each of the modems 12 and 16 are operable to perform digital simultaneous voice and data (DSVD) communications. The modems 12 and 16 transmit data to each other upon the communications path 14. Preferably, the data transmitted on the communications path 14 comprises frames of compressed speech data multiplexed with other digital data, such as Internet data, computer files, video data, digital audio data, or other types of data.

The client at the client modem 12, speaks into the handset 13 to converse with the second subscriber, who is connected through the network 15. A vocoder in the client modem 12 encodes, i.e., compresses, the client's speech into frames. The modem 12 multiplexes the compressed speech frames with data frames and transmits the speech and data frames across the communications path 14 to the server modem 16. The server modem 16 receives the stream of frames and demultiplexes the speech and data frames.

The compressed speech frames are then provided to a vocoder in the server modem 16 which decompresses the compressed speech frames to produce a speech signal, preferably an analog speech signal. The speech signal is provided on the telephone line 18 to the network 15. The network 15 provides the speech signal to a subscriber unit, such as a handset, at the second subscriber. The subscriber unit preferably comprises a speaker for transducing the analog speech signal into sound pressure waves which are audible to the second subscriber. The data frames are provided to the server 19, which preferably provides the data to a data source such as a LAN or the Internet.

An echo of the decompressed analog speech signal which the server modem 16 provides to the telephone line 18 occurs at the server modem 16 due to an impedance mismatch between the line 18 and circuitry in the server modem 16 to interface the vocoder to the line 18. This echo signal, along with the second subscriber's speech, if any is present, is received by the vocoder and compressed into compressed speech frames. The compressed speech frames are multiplexed and transmitted by the server modem 16 to the client modem 12. The client modem 12 receives the frames and demultiplexes the speech frames from the data frames. The client modem 12 decompresses the received speech frames to produce a speech signal. It is noted that, if the second subscriber is talking during this instant of time, the speech signal will comprise a compressed form of the second subscriber's speech and possibly a compressed form of the echo. If the second subscriber is not talking during this time instant, then the speech signal may comprise only echo. The speech signal is transduced into speech which the client hears on the handset 13 speaker.

The speech heard by the client may include the echo, which may be audible and annoying to the client, particularly if the echo is not being "covered up" by the client or second subscriber's speech. The echo during silent periods may be particularly annoying due to a relatively long delay time caused by the compressing and decompressing of the speech by digital signal processing techniques which are performed by both the client modem 12 and the server modem 16. If this echo is not suppressed, it will be transmitted in the compressed speech frames to the client modem and potentially be annoying to the client as just described. Since this is an echo of the client's speech, i.e., the near end subscriber, but occurs at the server, i.e., at the far end of the communications path 14, the echo is commonly referred to as "far end echo."

The present invention comprises a system and method for suppressing the far end echo which would be experienced by the client. Advantageously, the server modem 16 detects the presence of the echo in the compressed speech frames to be transmitted by the server modem 16 to the client modem 12 and performs echo suppression on the compressed speech frames prior to transmitting the compressed speech frames to the client modem 12. The server modem 16 performs the echo suppression by detecting a likelihood of the presence of the far end echo during periods of relative silence and replacing compressed speech frames which have echo with a "quiet frame". The quiet frames, along with the remaining compressed speech frames in the series, are then decompressed to produce a speech signal in which the echo is suppressed.

Preferably, a "quiet frame" comprises a frame of compressed audio which was sampled with the microphone portion of a telephone subscriber handset removed from the circuit thereby producing a frame in which sound is essentially absent. That is, only white noise is sampled and stored in the quiet frame. In an alternate embodiment, a quiet frame comprises a frame in which silence has been compressed. In an alternate embodiment, a quiet frame comprises a frame in which the volume parameter of the compressed speech has been assigned a zero value. The echo suppression method will be described in detail below.

Figure 2:
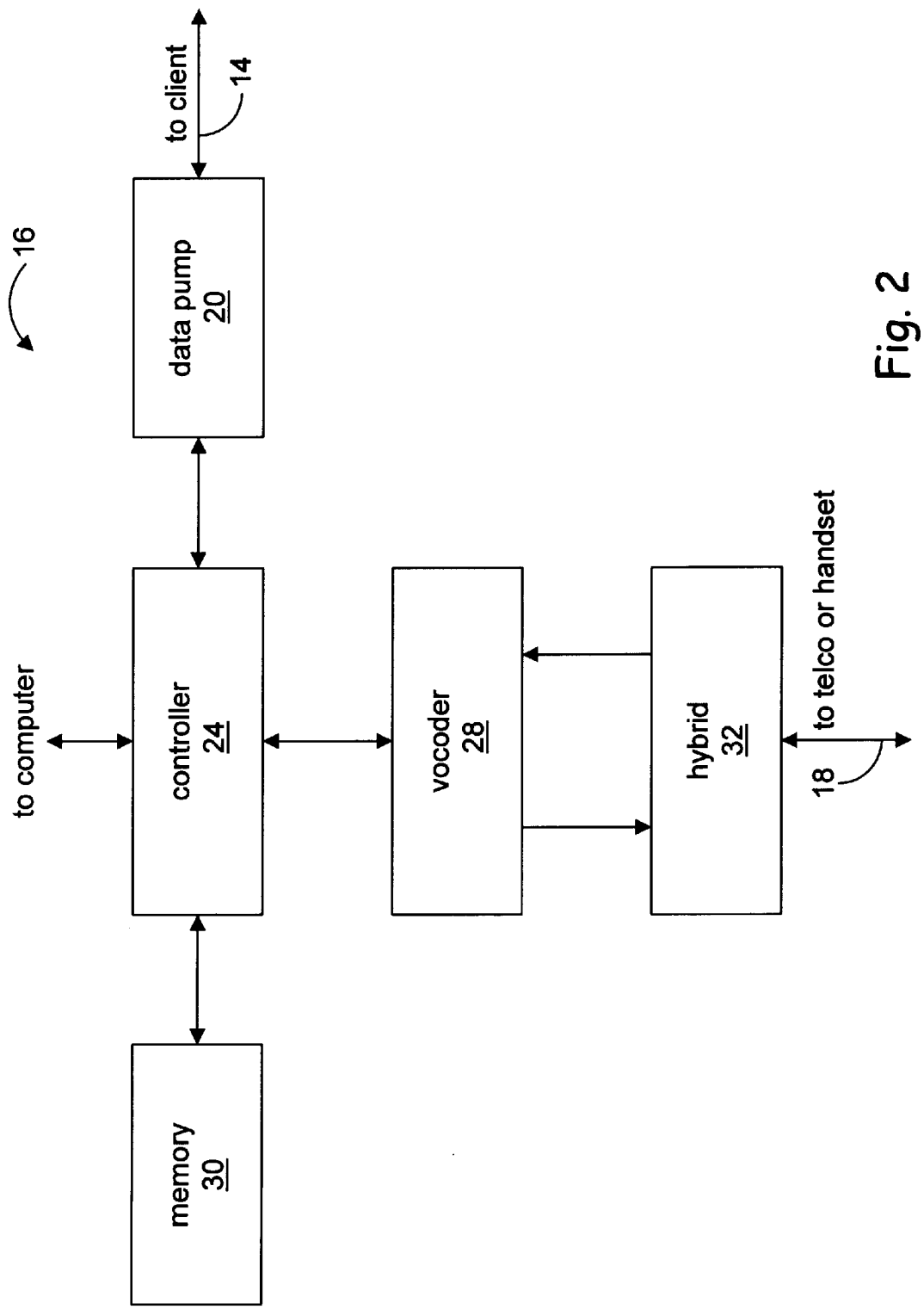
FIG. 2 is a block diagram of the server modem of FIG. 1.

FIG. 2—Modem Block Diagram

Referring now to FIG. 2, a block diagram of the server modem 16 of FIG. 1 is shown. In one embodiment, the client modem 12 is identical to the server modem 16, however, the client modem 12 is configured, preferably via jumpers, to interface with a handset 13 rather than to a telephone line 18. In particular, the client modem 12 configuration is capable of providing a DC battery voltage and a ring signal to the handset 13 and the server modem 16 configuration is capable of detecting a ring signal.

The modem 16 comprises a data pump 20 coupled to the communications path 14. Data pumps are well known in the art of modem design. Preferably the data pump 20 is a Lucent Technologies M-1634. The data pump performs the functions, among others, of modulating digital data to produce modulated signals for transmission on the communications path 14 to the client modem 12 and demodulating modulated signals received from the client modem 12 to produce digital data. Preferably, the data pump 20 comprises an asynchronous serial interface for transferring data frames between an asynchronous serial interface comprised in a controller 24.

The controller 24 performs various control functions of the server modem 16. Preferably, the modem 16 is a DSVD modem, and the controller 24 demultiplexes simultaneously transmitted, i.e., multiplexed, speech and data frames received from another DSVD modem. The controller 24 is operable to receive compressed speech frames, i.e., voice encoded speech, from the data pump 20 and provide the data frames to a vocoder 28 coupled to the controller 24. The controller 24 is also operable to receive compressed speech frames from the vocoder 28 and provide the compressed speech frames to the data pump 20. In one embodiment, the controller 24 is operably coupled to the server 19 by an expansion bus, such as an Industry Standard Architecture (ISA) or Peripheral Component Interconnect (PCI) bus, through bus interface circuitry. The controller 24 receives data from and sends data to the computer for exchange with the client.

In particular, the controller 24 is operable to detect the presence of far end echo during relatively silent periods by comparing a volume parameter of a frame received from the vocoder 28 to a volume parameter of one of the frames previously provided to the vocoder 28 which may have generated the far end echo. If the controller detects the echo, the controller 24 substitutes quiet frames for the frame received from the vocoder 28, as will be described below. The controller 24 comprises any processor device which is capable of executing a stored program of instructions or embedded controller device. Preferably, the controller 24 comprises a processor, such as a microprocessor core, and peripheral devices, such as the asynchronous serial interface. In one embodiment, the controller 24 is a Zilog Z80182 microcontroller.

Preferably, the stored program instructions which the controller 24 executes are comprised within a memory 30, such as a read-only memory (ROM), programmable ROM (PROM), erasable PROM (EPROM), FLASH memory, dynamic random access memory (DRAM), static random access memory (SRAM), among others, or a combination thereof. The memory is used to store programs instructions and data executed by the controller 24. The memory 30 comprises frame buffers used to buffer frames received from the data pump 20 before being provided to the vocoder 28, and to buffer frames received from the vocoder 28 before being provided to the data pump 20. Preferably, the asynchronous serial port on the controller 24 receives bytes or blocks of data, and the controller 24 places the bytes or blocks of data into one of the frame buffers until an entire frame has been placed into the buffer. The memory 30 may be comprised within or without the controller 24.

Vocoders, such as vocoder 28, are well known in the art of voice encoded speech. Preferably, the vocoder 28 comprises an AT&T 1635. The vocoder 28 encodes speech signals received from the telephone line 18 and provides the compressed speech frames to the controller 24. The vocoder 28 also receives compressed speech frames from the controller 24 and decodes the compressed speech frames back to produce analog voice signals which are provided to the telephone line for reproduction to the second subscriber.

In one embodiment, a compressed speech frame comprises 39 characters, or bytes. Of the 39 bytes, 32 of the bytes comprise voice encoded speech, 5 of the bytes comprise standard protocol control bytes, such as v.42 protocol bytes, and 2 bytes comprise voice frame specific control bytes. Preferably, the standard protocol bytes comprise error checking and/or error correction bytes, such as cyclic redundancy code (CRC) bytes. The voice encoded speech bytes comprise parameters which specify an encoded representation of the speech received by the vocoder 28 from the handset 13. In particular, one of the compressed speech parameters comprised within a compressed speech frame is a volume, or amplitude, parameter.

In one embodiment, the compressed speech frames are TrueSpeech8 voice frames. The TrueSpeech8 voice frames comprise two header bytes in the two voice frame specific control bytes. The TrueSpeech8 voice frames further comprise the 32 bytes of voice encoded speech arranged as sixteen data/speech words, wherein a word comprises sixteen bits. In one embodiment, the volume parameter information is comprised within the four least significant bits of the low order byte of words 8, 10, 12, and 14. Table I below shows the byte order of the voice frame with the bytes including the volume parameter information indicated by two asterisks.

TABLE 1

| data bytes | | corresponding word |
| --- | --- | --- |
| 0 | 1 | 0 |
| 2 | 3 | 1 |
| 4 | 5 | 2 |
| 6 | 7 | 3 |
| 8 | 9 | 4 |
| 10 | 11 | 5 |
| 12 | 13 | 6 |
| 14 | 15 | 7 |
| 16** | 17 | 8 |
| 18 | 19 | 9 |
| 20** | 21 | 10 |
| 22 | 23 | 11 |
| 24** | 25 | 12 |
| 26 | 27 | 13 |
| 28** | 29 | 14 |
| 30 | 31 | 15 |

Preferably, the vocoder 28 comprises an analog-to-digital (A/D) converter for converting an analog speech signal received from the telephone line 18 into a digital speech signal which may be processed by a digital signal processor (DSP) comprised within the vocoder 28. The vocoder 28 further comprises a digital-to-analog (D/A) converter for converting a digital speech signal from the DSP into an analog speech signal. The DSP processes speech frames received from the client modem 12 to produce the digital speech signal converted by the D/A converter.

Preferably, the server modem 16 further comprises a hybrid circuit 32 coupled between the vocoder 28 and the telephone line 18 for converting between a pair of transmit and receive signals from the vocoder 28 and a bidirectional signal from the telephone line 18. Preferably, the hybrid 32 is a 2-to-4 wire resistor network as is commonly used in telephony equipment for converting between a 2-wire bi-directional signal and a 4-wire bi-directional set of signals. The 4-wire bi-directional set of signals comprises a 2-wire transmit signal pair and a 2-wire receive signal pair. Preferably, the vocoder D/A converter is coupled to the 2-wire receive signal pair and provides the uncompressed analog speech signals to the hybrid 32. Preferably, the vocoder A/D converter is coupled to the 2-wire transmit signal pair and receives analog speech signals from the telephone line 18 through a line interface. In one embodiment, the hybrid 32 is designed to interface to a 600 ohm line.

A substantial portion of the far end echo previously described occurs as the result of an impedance mismatch between the telephone line 18 and the hybrid 32. Echo which is the result of 2-to-4 wire hybrid conversion circuits is well known in the art of telephony devices. The echo is reflected back into the vocoder 28, which compresses the echo signal, along with the speech signal received from the telephone line 18, into compressed speech frames. These compressed speech frames are transmitted to the client modem 12 which decompresses the compressed speech frames to produce speech signals. The server modem 16 advantageously suppresses the echo prior to transmitting the speech frames to the client, as will be described below in further detail.

Other echo generators may also exist on the network 15 side of the vocoder 28 which contribute to the far end echo and which are suppressed by the echo suppression method described. For example, handsets typically employ a 2-to-4 wire hybrid circuit to convert bi-directional signals received into a unidirectional signal to the speaker and a unidirectional signal from the microphone comprised in the handset. This hybrid may also be a source of far end echo.

In one embodiment, a line interface (not shown) is coupled between the hybrid 32 and the telephone line 18. Preferably, the line interface comprises various circuits commonly used in telephony devices, such as surge suppression circuits, impedance matching circuits, ring voltage detector circuits, on hook switches, and telephony interface transformers. A full-duplex analog speech signal passes through the line interface between the telephone line 18 and the hybrid 32.

Figure 3:
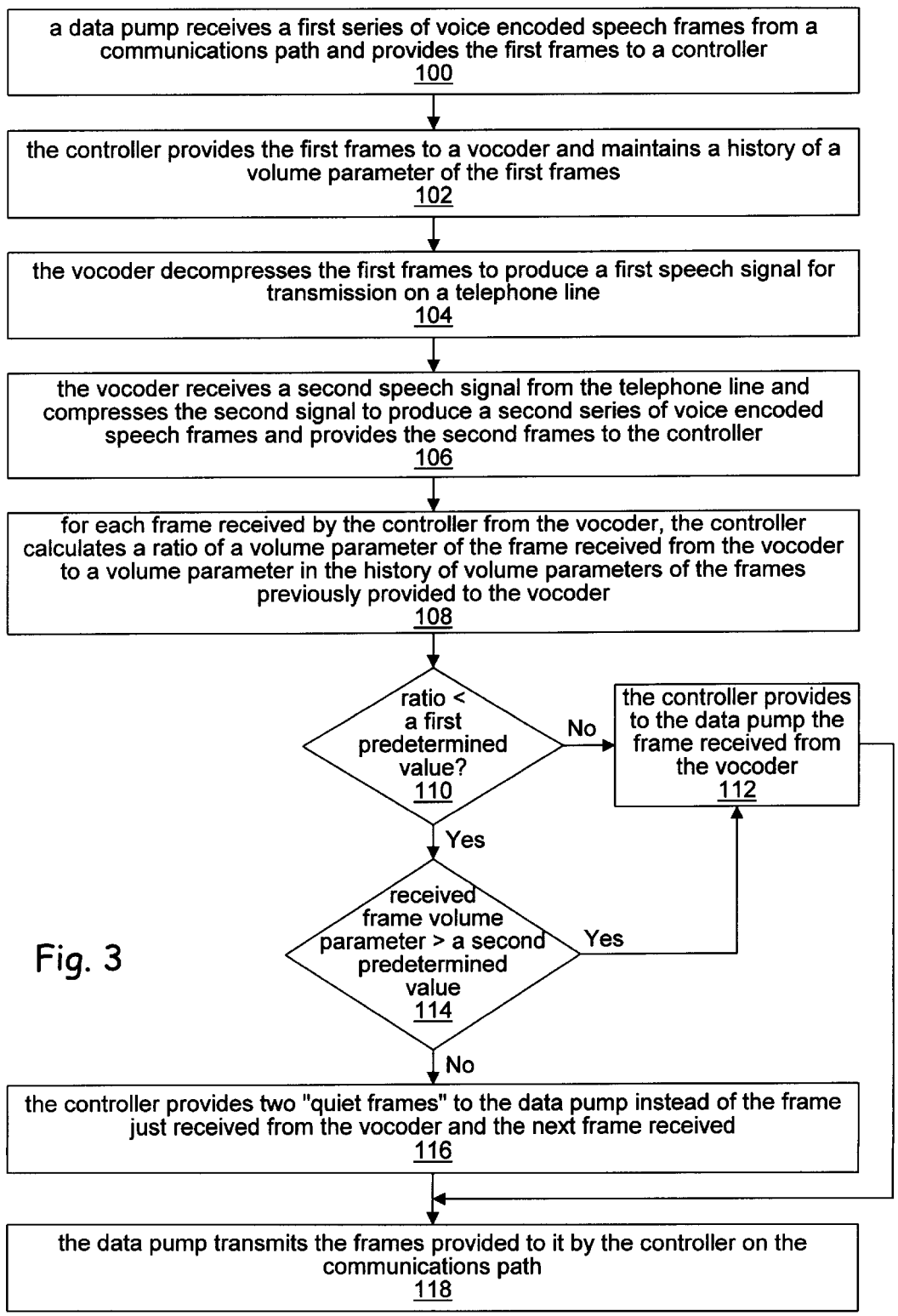
FIG. 3 is a flowchart illustrating operation of the modem of FIG. 2 in performing echo suppression of compressed speech frames according to a preferred embodiment of the present invention.

FIG. 3—Pre-decompression Echo Suppression Flowchart

Referring now to FIG. 3, a flowchart illustrating operation of the server modem 16 of FIG. 2 in performing echo suppression of compressed speech frames according to a preferred embodiment of the present invention is shown. The client modem 12 transmits a first series of voice encoded speech frames on the communications path 14 to the server modem 16. In one embodiment, the frames are transmitted with an average period of 30 milliseconds between frames. The data pump 20 in the server modem 16 receives each of the first series of frames from the communications path 14 and provides each frame to the controller 24, in step 100. As the controller 24 receives each of the first frames it provides each frame to the vocoder 28 and maintains a history of the volume parameters of the first frames, in step 102. Preferably, maintaining the history comprises storing the volume parameter value of one or more of first series of frames in the memory 30 coupled to the controller 24.

In one embodiment, the controller 24 provides frames to the vocoder 28 at substantially the same rate which the vocoder 28 provides frames to the controller 24. Thus, in some instances a given frame received from the vocoder 28 may include the echo associated with the frame just previously provided to the vocoder 28. However, in one embodiment, the vocoder 28 comprises a plurality of frame buffers for receiving compressed speech frames from the controller 24. The frame buffers are arranged in a first-in-first-out (FIFO) manner. The controller 24 provides the frames to the vocoder by writing into the frame buffer FIFO and has no indication of how full the FIFO is. That is, for a given frame received from the vocoder 28 the controller 24 has no indication of exactly which frame previously provided to the vocoder 28 corresponds to any echo present in the given frame received. However, the frame which corresponds to the echo must be within the number of frames which the FIFO is capable of storing, plus any buffering performed by the controller 24 itself. Therefore, preferably, the history of the volume parameters of the frames provided to the vocoder 28 is maintained at least as deep as the frame buffer FIFO plus any controller 24 buffering depth.

In one embodiment, the frame buffer FIFO is three frames deep and the controller 24 buffers one frame. Thus, the possibility exists that the current frame received from the vocoder 28 may include the echo associated with a frame which was provided to the vocoder 28 four frames previously. Therefore, in one embodiment, the controller 24 maintains a history of the volume parameter value of at least the last four frames provided to the vocoder 28. However, embodiments are contemplated in which the history depth is within a range of one to twenty.

As the vocoder 28 receives each of the first series of frames from the controller 24, the vocoder 28 decompresses each of the frames to produce a first speech signal for transmission on the telephone line 18, in step 104. The first speech signal propagates from the vocoder 28 to the hybrid 32 and an echo may occur due to a potential impedance mismatch between the hybrid 32 and the line 18.

Concurrently with the vocoder 28 providing the first speech signal to the line 18, the vocoder 28 also receives a second speech signal from the line 18, compresses the second speech signal to produce a second series of voice encoded speech frames, and provides each of the second frames to the controller 24, in step 106. The second speech signal may include the echo returned from the hybrid 32 and line 18 impedance mismatch. Therefore, some of the second series of compressed frames received by the controller 24 from the vocoder 28 may include the echo as well. Preferably, for each frame the controller 24 receives from the vocoder 28, the controller 24 calculates a ratio of the volume parameter of the frame received from the vocoder 28 to a volume parameter in the history, in step 108, in order to determine if the echo is present in the given frame. In one embodiment, the controller 24 calculates the ratio for only a subset of the second series of frames received from the vocoder 28.

If the energy of the speech received from the vocoder 28 is substantially less than the energy of the speech provided to the vocoder 28, a high likelihood exists that the echo, which may be detectable by the client, is present in the given frame received from the vocoder 28. The controller 24 determines for each of the frames received from the vocoder 28 if the calculated ratio is less than a predetermined value, in step 110. That is, the controller 24 determines whether or not there is a likelihood that echo is present in the given frame received from the vocoder 28.

In one embodiment the volume parameter values in the frames are logarithmic values. A mathematical property of logarithms states that an inequality in which the ratio of two numbers is compared to a third value may be transformed into an equivalent inequality by subtracting the logarithm of the denominator from the logarithm of the numerator and comparing the result with the logarithm of the third value. The transformation is shown by example below in which the logarithmic operation is applied to inequality (1) to produce equivalent inequality (2).

$$x/y < z \tag{1}$$

$$\log x - \log y < \log z \tag{2}$$

In one embodiment wherein the volume parameter values in the frames are values measured in decibels (dB), i.e., are logarithmic values, the two volume parameter values are subtracted and compared with a predetermined value which is also measured in dB. In one embodiment, the echo suppression method operates to suppress relatively small echo. In one embodiment, the method operates to suppress echo in which the echoed speech energy is less than one half the original, i.e., client's speech energy, and hence the predetermined value is −6 dB. In other words, the method presumes that echo is present during an otherwise silent period of the second subscriber when the speech energy is less than one half the original. In one embodiment, the method operates to suppress echo in which the echoed speech energy is less than one fourth the client's speech energy, hence the predetermined value is −12 dB. In other words, the method presumes that echo is present during an otherwise silent period of the second subscriber when the speech energy is less than one fourth the original. However, the method is not intended to be limited to the values above, but rather the values given are experimentally determined values. Other values may be chosen to perform the level of echo suppression needed. Embodiments are contemplated in which the predetermined value ranges between the values of 0.1 and 0.75. In other words, the method presumes that echo is present when the speech energy ratio is below a certain threshold.

If the ratio which was calculated in step 108 is not less than the predetermined value, i.e., if echo is not likely to be present, the controller 24 provides the given frame received from the vocoder 28 to the data pump 20, in step 112. The data pump 20 then transmits the frame to the client on the communications path 14, in step 118.

However, if the ratio is less than the predetermined value, the controller 24 provides a quiet frame to the data pump 20 instead of the frame received from the vocoder 28 to suppress the echo, in step 116. That is, the controller 24 substitutes a quiet frame for the frame received from the vocoder 28 in order to suppress the echo. In one embodiment, the controller 24 also substitutes another quiet frame for the next frame received from the vocoder 28 after the frame received from the vocoder 28 in which the ratio was less than the predetermined value. In other embodiments, more than one additional quiet frame is substituted for the frames received from the vocoder 28. Thus, if far end echo exists in the received compressed speech frame, the controller 24 suppresses the echo by decompressing silence, i.e., "quiet", rather than decompressing the echo-laden received compress speech frame.

In one embodiment, even if the ratio was determined during step 110 to be less than the predetermined value, the controller 24 determines if the volume parameter value in the given frame received from the vocoder 28 is greater than a second predetermined value, in step 114, and only substitutes the quiet frames if the received frame volume parameter is not greater than the predetermined value. The purpose of step 114 is to attempt to prevent suppressing the speech of the second subscriber if in fact the second subscriber is speaking. That is, if the second subscriber is speaking, but is speaking with enough less energy than the client such that the ratio of the second subscriber's speech energy is less than half, for example, the client's speech energy, then the determination in step 114 may prevent suppression of the second subscriber's valid speech. If the second subscriber is speaking above this second predetermined level, it is unlikely that the echo will be detectable by the client, and does not need to be suppressed.

CONCLUSION

Therefore, the present invention provides a system and method for suppressing far end echo of voice encoded speech wherein the echo suppression is performed by the modem at the far end of the communications path where the echo occurs. The modem at which the echo occurs detects the presence of echo in compressed speech frames and suppresses the echo by substituting quiet frames for the echo laden frames before transmitting the series of the compressed speech frames to the near end modem for decompression.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A modem configured to perform echo suppression, comprising:

a vocoder; and a controller configured to provide a first series of compressed speech frames to said vocoder, wherein each of said first series of compressed speech frames includes a volume parameter, wherein said controller is operable to maintain a history of said volume parameters of one or more of said first series of compressed speech frames;

wherein said vocoder is configured to receive said first series of compressed speech frames from said controller and to decompress said first series of compressed speech frames to produce a first speech signal for transmission on a telephone line;

wherein said vocoder is further configured to receive a second speech signal from said telephone line and to compress said second speech signal into a second series of compressed speech frames, wherein each of said second series of compressed speech frames includes a volume parameter, wherein said second speech signal may include an echo of said first speech signal;

wherein said controller is operable to receive said second series of compressed speech frames from said vocoder and for at least a subset of said second series of compressed speech frames to compare said volume parameter of each of said subset of said second series of compressed speech frames to a volume parameter in said history to determine if said echo of said first speech signal is present in said each of said subset of said second series of compressed speech frames;

wherein said controller is operable to substitute a quiet frame for said each of said subset of said second series of compressed speech frames in which said echo is determined to be present in order to suppress said echo.

2. The modem of claim 1, wherein said controller is operable to determine if said echo is present in said each of said subset of said second series of compressed speech frames by calculating a ratio of said volume parameter of said each of said subset of said second series of compressed speech frames to said volume parameter in said history and to determine if said ratio is less than a predetermined value.

3. The modem of claim 2, wherein said predetermined value ranges between the values of 0.1 and 0.75.

4. The modem of claim 2, wherein said controller maintains a history of a volume parameter of an Nth of said first series of compressed speech frames provided to said vocoder prior to receiving one of said second series of compressed speech frames the volume parameter of which is being compared, wherein said controller calculates said ratio using the Nth volume parameter in said history, wherein N is selected from a set consisting of a range of one to twenty.

5. The modem of claim 2, wherein said controller is operable to substitute said quiet frame for said each of said subset of said second series of compressed speech frames in which said echo is determined to be present only if said volume parameter of the corresponding one of said second series of compressed speech frames is less than a second predetermined value.

6. The modem of claim 1, wherein said controller is operable to substitute one or more additional quiet frames for one or more neighboring frames to said each of said subset of said second series of compressed speech frames in which said echo is determined to be present.

7. The modem of claim 1, wherein said modem is operable to perform digital simultaneous voice and data (DSVD) communications.

8. The modem of claim 1, further comprising a data pump configured to demodulate a first modulated signal to produce said first series of compressed speech frames and to provide said first series of compressed speech frames to said controller, wherein said data pump is further configured to receive said second series of compressed speech frames and said quiet frame from said controller and modulate said second series of compressed speech frames to produce a second modulated signal.

9. The modem of claim 1, further comprising a memory coupled to said controller, wherein said controller is operable to maintain said history by storing said volume parameters of one or more of said first series of compressed speech frames in said memory.

10. A system configured to perform echo suppression, comprising:

a first modem coupled to a communications path configured to transmit a first series of compressed speech frames onto said communications path and to receive a second series of compressed speech frames from said communications path;

a second modem coupled to said communications path, wherein said second modem comprises:

a controller configured to receive said first series of compressed speech frames from said communications path, wherein each of said first series of compressed speech frames includes a volume parameter, wherein said controller is operable to maintain a history of said volume parameters of one or more of said first series of compressed speech frames; and a vocoder configured to receive said first series of compressed speech frames from said controller and to decompress said first series of compressed speech frames to produce a first speech signal for transmission on a telephone line;

wherein said vocoder is further configured to receive a second speech signal from said telephone line and to compress said second speech signal into said second series of compressed speech frames for transmission on said communications path, wherein each of said second series of compressed speech frames includes a volume parameter, wherein said second speech signal may include an echo of said first speech signal;

wherein said controller is operable to receive said second series of compressed speech frames from said vocoder and for at least a subset of said second series of compressed speech frames to compare said volume parameter of each of said subset of said second series of compressed speech frames to a volume parameter in said history to determine if said echo of said first speech signal is present in said each of said subset of said second series of compressed speech frames;

wherein said controller is operable to transmit a quiet frame on said communications path instead of said each of said subset of said second series of compressed speech frames in which said echo is determined to be present in order to suppress said echo.

11. The system of claim 10, wherein said controller is operable to determine if said echo is present in said each of said subset of said second series of compressed speech frames by calculating a ratio of said volume parameter of said each of said subset of said second series of compressed speech frames to said volume parameter in said history and to determine if said ratio is less than a predetermined value.

12. The system of claim 11, wherein said controller maintains a history of a volume parameter of an Nth of said first series of compressed speech frames provided to said vocoder prior to receiving one of said second series of compressed speech frames the volume parameter of which is being compared, wherein said controller calculates said ratio using the Nth volume parameter in said history, wherein N is selected from a set consisting of a range of one to twenty.

13. The system of claim 11, wherein said controller is operable to substitute said quiet frame for said each of said subset of said second series of compressed speech frames in which said echo is determined to be present only if said volume parameter of the corresponding one of said second series of compressed speech frames is less than a second predetermined value.

14. The system of claim 10, wherein said first and second modems are operable to perform digital simultaneous voice and data (DSVD) communications.

15. A method of performing echo suppression, comprising:

providing a first series of compressed speech frames to a vocoder, wherein each of said first series of compressed speech frames includes a volume parameter;

maintaining a history of said volume parameters of one or more of said first series of compressed speech frames;

said vocoder decompressing said first series of compressed speech frames to produce a first speech signal for transmission;

said vocoder receiving a second speech signal and compressing said second speech signal into a second series of compressed speech frames, wherein each of said second series of compressed speech frames includes a volume parameter, wherein said second speech signal may include an echo of said first speech signal;

receiving said second series of compressed speech frames from said vocoder and for at least a subset of said second series of compressed speech frames comparing said volume parameter of each of said subset of said second series of compressed speech frames to a volume parameter in said history for determining if said echo of said first speech signal is present in said each of said subset of said second series of compressed speech frames; and substituting a quiet frame for said each of said subset of said second series of compressed speech frames in which said echo is determined to be present in order to suppress said echo.

16. The method of claim 15, wherein said comparing said volume parameter of each of said subset of said second series of compressed speech frames to a volume parameter in said history for determining if said echo of said first speech signal is present in said each of said subset of said second series of compressed speech frames comprises calculating a ratio of said volume parameter of said each of said subset of said second series of compressed speech frames to said volume parameter in said history and determining if said ratio is less than a predetermined value.

17. The method of claim 16, further comprising determining if said volume parameter of each of said subset of said second series of compressed speech frames in which said echo is determined to be present is less than a second predetermined value, wherein said controller substitutes said quiet frame for said each of said subset of said second series of compressed speech frames in which said echo is determined to be present only if said volume parameter of the corresponding one of said second series of compressed speech frames is less than said second predetermined value.

18. A computer-readable storage medium comprising program instructions, wherein said program instructions are operable to implement steps for performing echo suppression, the steps comprising:

providing a first series of compressed speech frames to a vocoder, wherein each of said first series of compressed speech frames includes a volume parameter;

maintaining a history of said volume parameters of one or more of said first series of compressed speech frames;

said vocoder decompressing said first series of compressed speech frames to produce a first speech signal for transmission;

said vocoder receiving a second speech signal and compressing said second speech signal into a second series of compressed speech frames, wherein each of said second series of compressed speech frames includes a volume parameter, wherein said second speech signal may include an echo of said first speech signal;

receiving said second series of compressed speech frames from said vocoder and for at least a subset of said second series of compressed speech frames comparing said volume parameter of each of said subset of said second series of compressed speech frames to a volume parameter in said history for determining if said echo of said first speech signal is present in said each of said subset of said second series of compressed speech frames; and substituting a quiet frame for said each of said subset of said second series of compressed speech frames in which said echo is determined to be present in order to suppress said echo.

19. The medium of claim 18, wherein said comparing said volume parameter of each of said subset of said second series of compressed speech frames to a volume parameter in said history for determining if said echo of said first speech signal is present in said each of said subset of said second series of compressed speech frames comprises calculating a ratio of said volume parameter of said each of said subset of said second series of compressed speech frames to said volume parameter in said history and determining if said ratio is less than a predetermined value.

20. The medium of claim 19, wherein the steps further comprise determining if said volume parameter of each of said subset of said second series of compressed speech frames in which said echo is determined to be present is less than a second predetermined value, wherein said controller substitutes said quiet frame for said each of said subset of said second series of compressed speech frames in which said echo is determined to be present only if said volume parameter of the corresponding one of said second series of compressed speech frames is less than said second predetermined value.

* * * * *